(12) United States Patent
Ellingsen

(10) Patent No.: US 6,250,386 B1
(45) Date of Patent: Jun. 26, 2001

(54) PROCESS FOR STIMULATION OF OIL WELLS

(75) Inventor: Olav Ellingsen, Florø (NO)

(73) Assignee: Eureka Oil ASA, Floro (NO)

( * ) Notice: Subject to any disclaimer, the term of this patent is extended or adjusted under 35 U.S.C. 154(b) by 0 days.

(21) Appl. No.: 09/331,877

(22) PCT Filed: Jan. 15, 1998

(86) PCT No.: PCT/NO98/00013

§ 371 Date: Jun. 28, 1999

§ 102(e) Date: Jun. 28, 1999

(87) PCT Pub. No.: WO98/31918

PCT Pub. Date: Jul. 23, 1998

(30) Foreign Application Priority Data

Jan. 16, 1997 (NO) ................................... 970194

(51) Int. Cl.⁷ .......................... E21B 43/25; E21B 28/00
(52) U.S. Cl. .................. 166/249; 166/177.2; 166/177.6; 166/177.7
(58) Field of Search ................. 166/249, 177.1, 166/177.2, 177.6, 177.7

(56) References Cited

U.S. PATENT DOCUMENTS

| | | | |
|---|---|---|---|
| 2,680,485 | * 6/1954 | Bodine | 166/73 |
| 2,894,724 | * 7/1959 | Andrew | 173/202 |
| 3,048,226 | * 8/1962 | Smith | 166/308 |
| 3,282,826 | 11/1966 | Winkler . | |
| 3,520,362 | 7/1970 | Galle | 166/249 |
| 3,743,017 | * 7/1973 | Fast et al. | 166/249 |
| 3,842,907 | 10/1974 | Baker et al. | 166/249 |
| 3,850,135 | * 11/1974 | Galle | 116/137 A |
| 3,963,598 | 6/1976 | Manowitz et al. . | |
| 4,250,015 | 2/1981 | Yang et al. . | |
| 4,261,736 | 4/1981 | Dewing et al. . | |
| 4,287,157 | 9/1981 | Koch . | |
| 4,316,873 | 2/1982 | Koch . | |
| 4,344,835 | 8/1982 | Koch . | |
| 4,344,836 | 8/1982 | Koch . | |
| 4,471,838 | 9/1984 | Bodine | 166/249 |
| 5,009,272 | * 4/1991 | Walter | 175/56 |
| 5,190,114 | * 3/1993 | Walter | 175/56 |
| 5,282,508 | 2/1994 | Ellingsen et al. | 166/249 |
| 5,285,847 | * 2/1994 | Halper et al. | 166/177.7 |
| 5,586,602 | * 12/1996 | Vagin | 166/249 |
| 5,914,027 | 6/1999 | Ellingsen . | |

FOREIGN PATENT DOCUMENTS

| | | |
|---|---|---|
| 161697 | 6/1989 | (NO) . |
| 175847 | 12/1994 | (NO) . |
| WO 94/08680 | 4/1994 | (WO) . |

OTHER PUBLICATIONS

Abstract of (DE 3300365), Title: Carbonisation of Residue From Hydrogenation of Heavy Oil or Coat–In Rotating Drum, Heated in Rotating Drum, Heated Internally by Heated Carbonisation Prod. Gas. Date Jul. 12, 1984.

Derwent's abstract, No. 79–17162B/09, week 7909, Abstract of JP,54010274 (Sato M). Jan. 25, 1979.

International Search Report dated Feb. 3, 1997.

* cited by examiner

Primary Examiner—David Bagnell
Assistant Examiner—Jennifer R Dougherty
(74) Attorney, Agent, or Firm—Merchant & Gould P.C.

(57) ABSTRACT

There is described a process for the stimulation of an oil reservoir or an oil well for enhanced oil recovery and/or seismic mapping of the reservoir, wherein a sound source is used. This sound source is operated by pressurized oil from the oil well by a hydraulic power unit at the surface, and the oil is conducted to an accumulator located in the sound source via a supply line.

3 Claims, 2 Drawing Sheets

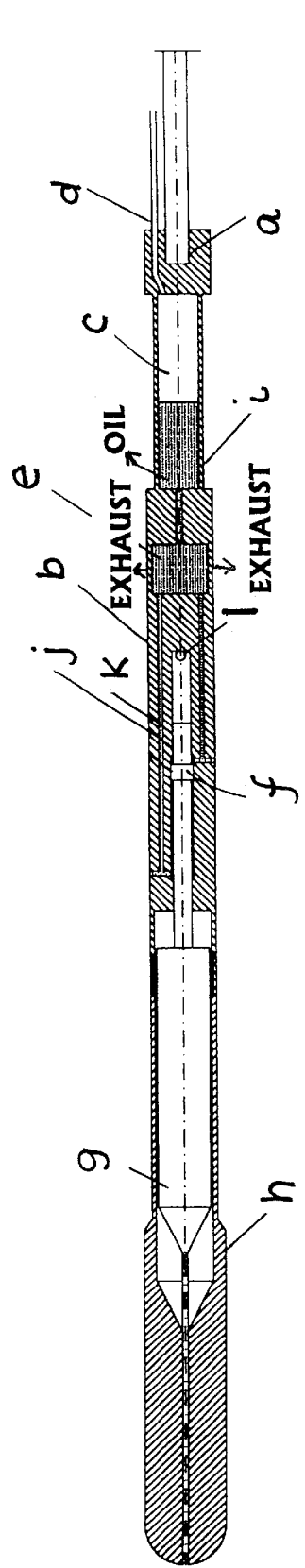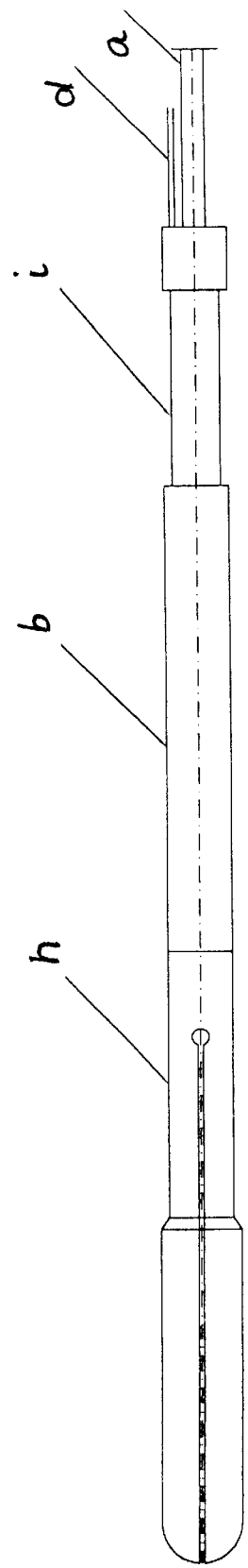
Fig.1b
Fig.1a

_US 6,250,386 B1_

PROCESS FOR STIMULATION OF OIL WELLS

TECHNICAL FIELD

The present invention relates to a process for the stimulation of oil wells by using sound waves which are emitted from the oil well by means of a hydraulically operated sound source or hammer.

BACKGROUND

To date, it has only been possible to recover parts of the oil found in subterranean oil reservoirs because of the special adherences which retain the oil in the formation. These are a combination of capillary forces, adhesive forces, cohesive forces and hydraulic forces.

Most part of the oil will remain in the reservoir until new technology makes it possible to enhance recovery efficiency by affecting the adherences which lock the oil to the formation. Since the reserves in an oil reservoir represent vast economic resources, it is of the greatest interest to develop methods and equipment in order to be able to enhance oil recovery efficiency.

Intensive research is being carried out worldwide in the field of so-called secondary oil recovery to find methods which increase the oil yield. These include methods ranging from injection of chemicals, electrical stimulation, electromagnetic stimulation and also various methods of acoustic stimulation. Interest has been directed in particular towards the conditions surrounding the surface tension between oil and water, where attempts have been made to solve the problems involved here by injecting tensides and surfactants In U.S. Pat. No. 5,282,508 there are described a number of different embodiments of vibrators for stimulating an oil reservoir in conjunction with electrical stimulation. These vibrators are powered by electricity, but the operation of vibrators using electric power in an oil well environment has been found to pose major practical problems with regard to insulation since the voltages used are about 1500 volts. There has thus been a need to develop a vibrator which could be operated by means of an energy source other than electricity. The most natural was to think of the use of hydraulics or gas, but the problem which arises when using a conventional vibrator as used, for example, in piling or in hydraulic hammers on excavators is that two oil supply lines must be used. In the case of short distances it is possible to use two lines, but when an oil well of several thousand meters is involved, this is impossible because of the pressure loss in the line.

SUMMARY OF THE INVENTION

It is an object of the present invention to show a tool which will enhance recovery efficiency and permit the start of oil production from oil wells where production has already come to a halt or is falling off rapidly. This is achieved with the aid of sound waves, where it has been found that the best effect is obtained when the sound waves are generated and transmitted to the formation from the oil-producing well.

An object of the present invention is to show an embodiment where it is only necessary to use one feed line for the oil and where the return oil is brought up in the actual production tubing in the oil well. To accomplish this, the following conditions must be fulfilled. There must be a power unit at the surface which continuously feeds pressure oil to the vibrator. Since this cannot be controlled with a valve from the surface because of the distance to the vibrator, there must be an accumulator therein which accumulates oil under pressure, but where the pressure also actuates the vibrator. This is achieved by means of a special valve which opens when the pressure in the accumulator reaches a determined level. The valve is so constructed that it alternates at the end of the stroke, i.e., when the plunger strikes against an expansion pipe, owing to a pressure top formed in the hydraulic system because of the sudden stop of the plunger. The fixed aperture of the valve determines the speed of the plunger, whilst the feed quantity of pressure oil determines the repetition frequency.

According to the invention, a process for the sound stimulation of oil wells is proposed, characterized in that there is placed in the well a vertically oscillating vibrator (hammer), which is operated by the produced oil from the oil well, in that a part of the oil is pumped to the vibrator from a hydraulic power unit at the surface, and where the exhaust oil from the vibrator is passed into the oil well and transported back with the produced oil from the oil formation. The vibrator generates elastic sound waves in that a plunger therein strikes against an expansion piece, and sends the sound waves into the reservoir as elastic sound waves having a repetition frequency of from a few hundred to several hundred per minute and where the frequency in the train of waves is composed of the resonance characteristic of the impact from the plunger, which has been found to be in the range of 100 Hz to just a few Hz.

BRIEF DESCRIPTION OF THE FIGURES

The invention will be described in greater detail with reference to the drawings wherein:

FIG. 1 shows the vibrator according to the invention, wherein 1(a) is an outline of the vibrator; and 1(b) is a section therethrough.

DETAILED DESCRIPTION

Figure 2:
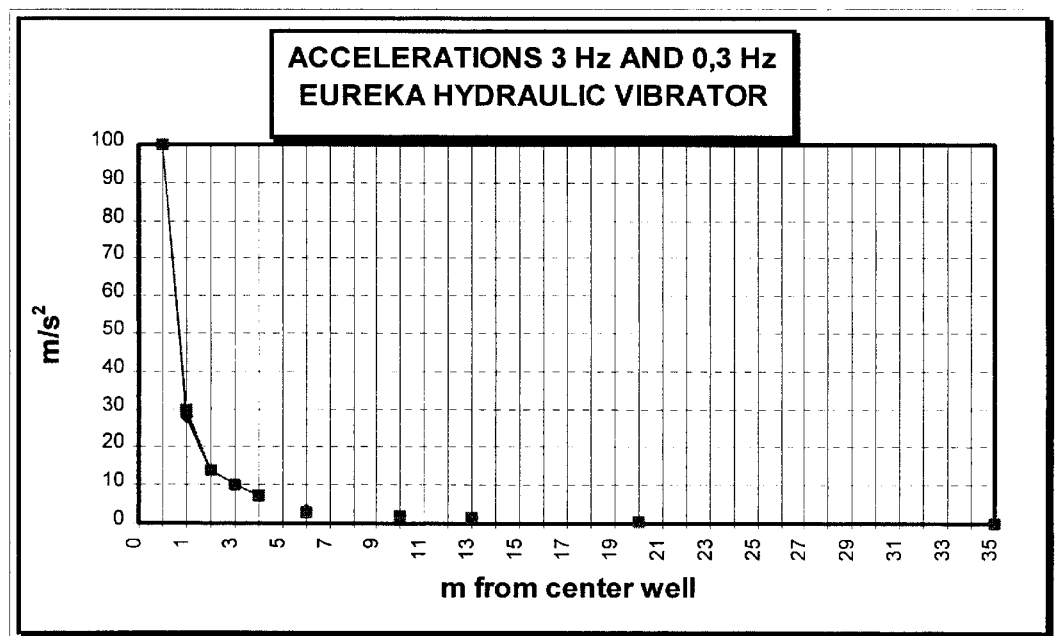
FIG. 2 presents the result of a test showing acceleration progress measured from the centre of the well.

The present invention is also suitable for use in connection with such methods and in conjunction with electrical and electromagnetic stimulation which are described, for instance, in Norwegian Patent 161 697 and U.S. Pat. No. 5,282,508.

The following is an account of how the sound waves affect oil production and what has been discovered through laboratory tests on the stimulation of three-dimensional oil reservoirs. The movement mechanisms in a reservoir can be as follows:

1. Fluid and matrix expansion.
2. Water displacement
3. Gas displacement
4. Solution-gas displacement The present invention can be used in conjunction with all these mechanisms.

In connection with gas dissolved in oil, the gas will expand in the form of small bubbles in the oil as the pressure falls, or as the reservoir is heated and the pressure is below the critical point. The gas bubbles will displace the oil, causing the oil to flow in the reservoir in the direction of the pressure drop.

The oil droplets are often surrounded by water, and very few particles exist in which the bubbles can grow. In this case there will be an increase in the bubble point in accordance with the increase in the boiling point, and the pressure at which the bubbles are formed will be substantially lower than the existing temperature would seem to indicate.

Therefore, the pressure must be reduced so that the bubbles can start growing on the microbubbles which are found in all liquids. It has been shown that acoustic vibrations affect the increase in bubble point so that the boiling may more easily start. In addition to this, the boundary surface tension between oil and gas will prevent the oil from flowing inside the reservoir. These boundary surface tensions are relatively low, and are reduced as pressure increases. A great effect will therefore be obtained even with weak vibrations.

Laboratory tests have shown that in a rock matrix in which the oil flow has stopped, it is possible to restart the flows with a vibration as weak as 0.04 g. With this, a recovery of 80% of the residual oil has been achieved. The explanation for this is that when the oil flow has stopped, a state of equilibrium will have been reached which can be altered by means of weak acoustic stimulation.

Since sound oscillations propagate in a radial direction from the well, and the oil flows towards the well, an optimum effect will be achieved with the consumption of a minimum amount of energy. Furthermore, it has been established that oil and other fluids flow more easily through a porous medium when the medium is affected by vibrations. This explains why even a fluid considered as a Newtonian fluid acts as if it were a thixotropic fluid in small droplets. In the border area between the flowing liquid and the surrounding pores, the molecules will become "aligned" as a consequence of higher or lower polarity.

If the fluid is vibrated, so-called capillary waves are obtained in the fluid, so that the molecules will have no time to establish polar links. The thixotrope becomes thinner and the oil will flow more freely. The sound energy which is absorbed in the reservoir will be transformed into heat and thereby increase the gas pressure as a consequence of partial evaporation. This will also give enhanced oil recovery.

It is a great advantage that the heat be generated in the reservoir itself, and thus that it does not have to be transported to the formation by means of heat conduction, steam supply or the like.

When water has penetrated the production wells, it is often the case that large quantities of oil are trapped in the reservoir due to the action of capillary forces. Intensive research has been carried out to develop tensides which are to be capable of reducing these capillary forces. It is believed that an acoustic process coupled with the use of tensides will be advantageous, as the method is very well suited for lowering the boundary surface tensions between oil and gas.

It has been possible to recover oil from water-entrapped oil by means of acoustic stimulation, but it has been necessary to use powerful vibrations (5–10 g) and the vibration direction has been the same as the direction of flow.

The function of the vibrator can be described as follows:

If the feed pressure of the pump and the adjustment of the valve are set at p(bar), the force of the piston is determined by $F=pA$, where A is the active piston surface which is equal to $A=\pi(D^2-d^2)/4$. The piston and the plunger have an acceleration of $a=F/G$, where C is the mass of the piston and plunger in kilos. The speed of the plunger on impact is calculated by $v=(2\,gs)^{0.5}$, where S is the distance of piston travel in meters. The time of the travel is obtained by $t=v/a$. At the point of impact, the piston and the plunger have accumulated a kinetic energy $E=Gv^2/2(Nm)$. The power in the impact is expressed by the impulse theorem $P=E/\Delta t$, where $\Delta t$ is the stopping time of the piston. Tests have shown that with moderate dimensions, it is possible to accumulate about 3000 Nm and with a stopping time of about 10 minutes it is possible to obtain power at the instant of impact of 300,000 W.

Besides being able to use the vibrator for stimulating an oil well with a view to extracting more oil from the reservoir, the vibrator will be capable of being utilized as a continuously operating seismic sound source for mapping the reservoir and charting how the fluids therein change as the oil flows in the reservoir. This will be of great importance—especially in offshore oil wells—for the planning of production from each individual well with a view to optimizing the total recovery from the reservoir.

The actual vibrator and all its components are suspended in the end of the tubing a), wherein there is mounted a conventional jacking pump which transports oil from the well to the surface. In the housing b) there is provided a cavity c) which functions as an accumulator for the oil that is fed therein from the feed pipe d). The accumulator is pre-filled with a gas which may preferably be nitrogen and which acts as a spring when compressed by the oil.

From the accumulator, the oil flows down to a special valve e) which is arranged so that it admits oil from the accumulator when the pressure reaches maximum charge pressure in the accumulator. Oil will then be conducted to the upper side of the piston f) and will press this downwards together with the plunger g). When the plunger strikes the expansion tube h), this will in turn strike the casing in the oil well and send the sound waves outwards. The impact results in a pressure top in the hydraulic system which causes the valve to alternate and conduct oil to the underside of the piston f), lifting this and the plunger up again. During the stroke, the pressure in the accumulator falls a little, but when this builds up again, a new stroke is made. The stroke frequency is thus controlled by the oil quantity supplied and this in turn is regulated by the feed pump.

The return oil, or to be more precise, the exhaust oil, from the strokes passes out into the well at the side of the valve, as shown. At the accumulator, the housing b) has a narrowed part I) which functions as a grip for a tool at the surface when mounting the first production tubing. On the upper side of the piston rod j) there is an opening l) at the top in the bore k) in the housing which allows oil from the formation to "breath" in and out with the strokes.

What is claimed is:

1. A process for stimulating oil recovery in an oil well having a lower end and an upper end, the well comprising a housing with a sound source and oil accumulator at the lower end of the well, the process comprising steps of:

using a hydraulic power unit to provide pressurized oil to the oil accumulator via a supply line;

operating the sound source with said pressurized oil;

expelling the pressurized oil back to the well;

opening a valve when oil pressure in the accumulator reaches a certain level;

providing pressurized oil to an upper side of a piston, thereby pressing the piston and a plunger downward;

striking an expansion pipe with the plunger, the resulting sound waves creating a pressure peak that reverses the direction of the valve; and providing oil from an underside of the piston, thereby lifting the piston and plunger back to their previous position.

2. A process for stimulating oil recovery in an oil well having a lower end and an upper end, the well comprising a housing with a sound source and oil accumulator at the lower end of the well, the process comprising steps of:

using a hydraulic power unit to provide pressurized oil to the oil accumulator via a supply line;

operating the sound source with said pressurized oil; wherein the step of operating the sound source comprises:

opening a valve when the oil pressure in the accumulator reaches a certain level;

providing pressurized oil to an upper side of a piston, thereby pressing the piston and a plunger downward;

striking an expansion pipe with the plunger, the resulting sound waves creating a pressure peak that reverses the direction of the valve; and providing oil from the underside of the piston, thereby lifting the piston and plunger back to their previous position.

3. A process for seismic mapping of an oil reservoir using a well having a lower end and an upper end, the well comprising a housing with a sound source and oil accumulator at the lower end of the well, the seismic mapping process comprising steps of:

using a hydraulic power unit to provide pressurized oil to the oil accumulator via a supply line;

operating the sound source with said pressurized oil; wherein the step of operating the sound source comprises:

opening a valve when the oil pressure in the accumulator reaches a certain level;

providing pressurized oil to an upper side of a piston, thereby pressing the piston and a plunger downward;

striking an expansion pipe with the plunger, the resulting sound waves creating a pressure peak that reverses the direction of the valve; and providing oil from the underside of the piston, thereby lifting the piston and plunger back to their previous position.

\* \* \* \* \*